United States Patent [19]

Emoto et al.

[11] Patent Number: 4,636,625
[45] Date of Patent: Jan. 13, 1987

[54] METHOD AND DEVICE FOR DETECTING FOCAL POINT

[75] Inventors: Masami Emoto; Masanobu Nishimiya; Hiroyuki Kiguchi, all of Kanagawa, Japan

[73] Assignee: Ricoh Company, Ltd., Tokyo, Japan

[21] Appl. No.: 772,756

[22] Filed: Sep. 5, 1985

[30] Foreign Application Priority Data

Sep. 6, 1984 [JP] Japan .................. 59-186962
Dec. 27, 1984 [JP] Japan .................. 59-281755

[51] Int. Cl.⁴ .................... G01J 1/20; G11B 7/12
[52] U.S. Cl. .................... 250/201; 250/204; 369/45
[58] Field of Search ............. 250/201 AF, 204, 201; 369/45

[56] References Cited

U.S. PATENT DOCUMENTS 4,503,324  3/1985  Yokota .................. 250/201

Primary Examiner—Gene Wan
Attorney, Agent, or Firm—Cooper, Dunham, Griffin & Moran

[57] ABSTRACT

Less than half of a laser beam reflected from an optical information storage medium through an objective lens is detected by a detector having two light detecting areas. The sum of output signals from the light detecting areas of the detector is employed to detect when the objective lenas enters a focusing range. The difference between the output signals is employed to detect when the laser beam is focused on the optical information storage medium.

3 Claims, 11 Drawing Figures

METHOD AND DEVICE FOR DETECTING FOCAL POINT

BACKGROUND OF THE INVENTION

1. Field of the invention

The present invention relates to a method of and a device for detecting the focal point in an optical pickup.

2. Description of the Prior Art

Optical pickups direct the laser beam from a laser beam source through an objective lens onto an optical information storage medium such as an optical memory disk for reading the information stored on the information storage medium or writing information on the information storage medium. For either reading or writing the information, the laser beam has to be focused by the objective lens accurately on the information storage medium.

For accurately focusing the laser beam, it is necessary to detect whether the laser beam is focused by the objective lens on the information storage medium. Various methods have been known as focal point detecting methods. One of such known focal point detecting methods is known as a so-called knife-edge focal point detecting method.

FIG. 5 of the accompanying drawings schematically illustrates an optical pickup employing a knife-edge focal point detecting method. The optical pickup includes a laser beam source 1 comprising a semiconductor laser for emitting a laser beam, a coupling lens 2, a polarization beam splitter 3, a quarter-wave plate 4, an objective lens 5 for focusing the laser beam onto an information storage medium 6, a convergent lens system 7, a first detector 8 for detecting a deviation of the laser beam from a desired track, and a second detector 9 for detecting the focal point.

The laser beam emitted from the semiconductor laser 1 is converted by the coupling lens 2 into parallel rays which are then reflected to the left (as shown) by the polarization beam splitter 3. The laser beam from the polarization beam splitter 3 passes through the quarter-wave plate 4 and the objective lens 5, which focuses the laser beam as a small light spot onto the information storage medium 6.

The information storage medium 6 is generally in the form of a disk bearing recording tracks arranged as concentric circular tracks or in a spiral pattern. The information storage medium 6 will hereinafter be referred to as a disk 6.

As the disk 6 is rotated about its own axis, the laser beam falling on a recording track on the disk 6 is reflected thereby and falls rightwardly on the objective lens 5. The reflected laser beam passes through the objective lens 5 and the quarter-wave plate 4 and falls rightwardly on the polarization beam splitter 3. Since the laser beam passes twice through the quarter-wave plate 4, the plane of polarization thereof has rotated 90°, allowing the laser beam to pass linearly to the right through the polarization beam splitter 3 into the focusing lens system 7. After the laser beam has passed through the convergent lens system 7, it is converged thereby toward the second detector 9. The objective lens 5 and the convergent lens system 7 have a common optical axis AX.

As shown in FIG. 6, the second detector 9 has two light detecting areas A, B divided by an intermediate line extending perpendicularly to the sheet of FIG. 5 with the light detecting surfaces lying perpendicularly to the optical axis AX.

The first detector 8 has a straight edge (knife edge) extending perpendicularly to the sheet of FIG. 5. The first detector 8 is positioned between the covergent lens system 7 and the second detector 9.

As illustrated in FIG. 7, the first detector 8 comprises two light detecting areas C, D for detecting 50% of the luminous flux of the laser beam converged by the convergent lens system 7 to block 50% of the laser beam directed toward the second detector 9.

In FIG. 5, the laser beam is properly focused by the objective lens 5 onto the disk 6. At this time, the laser beam reflected by the disk 6 is converted by the objective lens 5 to parallel rays which are passed through and converged by the convergent lens system 7 to the focal point thereof.

Experiments indicated that, regardless of the presence of the first detector 8, the laser beam is converged by the convergent lens system 7 to the focal point thereof as a light spot having a diameter of about 100 micrometers.

Under this condition, photoelectrically converted signals SA, SB are produced respectively from the light detecting areas A, B of the second detector 9, and the difference (SA−SB) is employed as an focal point error signal. The second detector 9 is positionally adjusted with respect to the light spot so that the focal point error signal will be eliminated.

When the laser beam is correctly focused on the disk 6, the focal point error signal (SA−SB) is zero, i.e., the light detecting areas A, B of the second detector 9 detect the same amount of light.

If the disk 6 is shifted from the position of the focal point of the objective lens 5 in a direction away from the objective lens 5, then the laser beam reflected from the disk 6 is converged by the objective lens 5 and also by the convergent lens system 7. The point where the laser beam converges is displaced toward the convergent lens system 7 as shown in FIG. 8, thus increasing the amount of light detected by the light detecting area A of the second light detector 9. Therefore, the focal point error signal (SA−SB) is expressed by (SA−SB)>0.

If the disk 6 is shifted from the focused position toward the objective lens 5, then the laser beam reflected from the disk 6 remains divergent as it passes through the objective lens 5. The point where the laser beam converges through the convergent lens system 7 is displaced rightwardly of the second detector 9 as shown in FIG. 9. The amount of light detected by the light detecting area B of the second light detector 9 is then increased, and the focal point error signal (SA−SB) is represented by (SA−SB)<0.

The optical pickup as a whole or the objective lens 5 only can be displaced along the optical axis AX in a direction dependent on the focal point error signal to eliminate the focal point error signal for thereby focusing the laser beam correctly on the disk 6.

The foregoing process is a summary of the knife-edge focal point detecting method.

Generally, the focal point of the objective lens 5 is detected by the above system, and the objective lens 5 is displaced along the optical axis AX by a servo control system (not shown) so that the focal point of the objective lens 5 will be positioned in a range of ±1 micrometer from the recording surrace of the disk 6. In order to avoid the danger of collision between the disk 6 and the objective lens 5, an original position for the objective lens 5 is established at a sufficient distance from the disk 6. At the same time that the disk 6 starts being scanned by the optical pickup, the objective lens 5 is progressively moved toward the disk 6 for focusing the laser beam onto the disk 6. Such a process is referred to as a "focusing process".

As shown in FIG. 10, the focal point error singal (SA−SB) has its voltage level eliminated when the laser beam is focused, and also when the objective lens 5 is spaced about 100 micrometers or more from the focused position in a direction away from the disk 6, or when the objective lens 5 is spaced about 150 micrometers or more from the focused position in a direction toward the disk 6. Where the original position for the objective lens 5 is spaced 500 micrometers from the focused position, and if the focal point were to be detected only by the focal point error signal (SA−SB), then the servo control system would be liable to be locked since the voltage level of the focal point error signal (SA−SB) would be zeroed in conditions, as described above, other than when the laser beam is focused.

One auxiliary way of preventing such a drawback has been to employ an information signal Rf representative of the sum (SA+SB+SC+SD) of the photoelectrically converted signals (SA+SB) from the light detecting areas A, B of the second light detector 9 and the photoelectrically converted signals (SC+SD) from the light detecting areas C, D of the first light detector 8. The information signal Rf is illustrated in FIG. 10 as being half of the acutual value thereof.

The information signal Rf has a certain voltage level when the laser beam is focused on the disk 6. Therefore, the focal point can stably be detected by determining that the focused condition is reached when the focal point error signal (SA−SB) is zero and also the information signal Rf has a predetermined voltage level or higher during the focusing process.

However, the sensitivity of detection of the focal point in the above method is not necessarily high for the following reasons: The laser beam reflected from the disk 6 and passing through the objective lens 5 for the detection of the focal point will be referred to as a focal point detecting beam or flux, which is indicated by FLX in FIG. 7. The focal point detecting beam may also be used for other purposes such as for reading information stored on the disk 6 or for tracking the disk 6.

As shown in FIG. 7, the first light detector 8 blocks 50% of the focal point detecting beam which would otherwise reach the second light detector 9. However, under the focused condition, the laser beam falls on the light detecting area B as well as the light detecting area A due to diffraction.

The focal point detecting beam has an intensity peak in the vicinity of the optical axis AX. The ray which travels on the optical axis of the objective lens 5 will be referred to as an axial ray. The beam or flux in the neighborhood of the axial ray has a strong intensity and falls on both light detecting areas A, B of the second light detector 9 due to diffraction. The beam falling on the second light detector 9 in the neighborhood of the axial ray remains substantially unchanged irrespectively of whether the laser beam is focused on the disk 6 or not.

Light rays which are primarily responsible for substantially changing the focal point error signal (SA−SB) are those spaced from the axial ray.

Therefore, the cause of the detection sensitivity that is not so high is the presence of the beam or flux of the focal point detecting beam which is in the vicinity of the optical axis or axial ray.

The ratio of the difference between the signals from the light detecting areas A, B to the sum of the signals from the light detecting areas A, B is used as the focal point or focus detecting sensitivity. The focal point detecting sensitivity was plotted, as shown in FIG. 11, as the ratio of the focal point detecting beam or flux FLX blocked by the first detector 8 was varied. As a result, it was confirmed that the focal point detecting sensitivity had a peak when 70 to 80% of the flux containing the axial ray was blocked with respect to the second light detector 9, and the focal point detecting sensitivity was effectively increased when the flux was blocked in the range of from 60 to 90%.

Since the flux in the neighborhood of the axial ray is primarily responsible for the reduction of the focal point detecting sensitivity, as described above, it is preferable that the amount of light blocked by the first light detector 8 with respect to the second light detector 9 be at least ½ of the total beam which would reach the second light detector 9, or preferably in the range of 60 to 90% of the total beam.

Where the amount of light blocked by the first light detector 8 with respect to the second light detector 9 is in the desired range for an increased focal point detecting sensitivity, only the signals (SC+SD) from the light detecting areas C, D of the first light detector 8 are useful for producing an information signal Rf', without the addition of the signals (SA+SB) from the second light detector 9, as a sufficient amount of light falls on the light detecting areas C, D.

However, the beam detected by the first light detector 8 contains the intensive light in the vicinity of the optical axis. Therefore, the voltage level remains virtually unchanged as shown in FIG. 10 irrespectively of the defocused distance by which the laser beam is out of focus. Consequently, the information signal Rf cannot be employed in the focusing process. The information signal Rf' is illustrated in FIG. 10 as being 1/5 of the actual value thereof for the sake of brevity.

SUMMARY OF THE INVENTION

It is an object of the present invention to provide a method of and a device for detecting the focal point in an optical pickup to carry out a focusing process effectively with an increased focal-point detecting sensitivity which is achieved by positioning a first detector to block at least half of a reflected laser beam which would reach a second detector.

According to the present invention, there is provided a method of detecting the focal point in an optical pickup employing a knife-edge focal point detection, the method comprising the steps of converging a laser beam through an objective lens as a small spot on an optical information storage medium, detecting more than half of a laser beam reflected from the optical information storage medium through the objective lens with a first track-deviation detector composed of a plurality of light detecting areas, detecting less than half of the reflected laser beam with a second focal-point detector composed of a a plurality of light detecting areas, and positionally adjusting the objective lens with respect to the optical information storage medium so that a sum signal indicating the sum of signals from the light detecting areas of the second detector will be greater than a prescribed value and a difference signal indicating the difference between the signals from the light detecting areas of the second detector will be eliminated, for focusing the laser beam on the optical information storage medium.

According to the present invention, there is also provided a device for detecting the focal point in an optical pickup wherein a laser beam is converged by an objective lens as a small spot on an optical information storage medium, the device comprising a detector having a plurality of light detecting areas for detecting less than half of a laser beam reflected from the optical information storage medium through the objective lens, first means for detecting when the objective lens enters a focusing range in response to a sum signal indicative of the sum of output signals from the light detecting areas of the detector, and second means operable upon detection by the first means for positionally adjusting the objective lens with respect to the optical information storage medium so that a difference signal indicative of the difference between the output signals from the light detecting areas will be eliminated.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
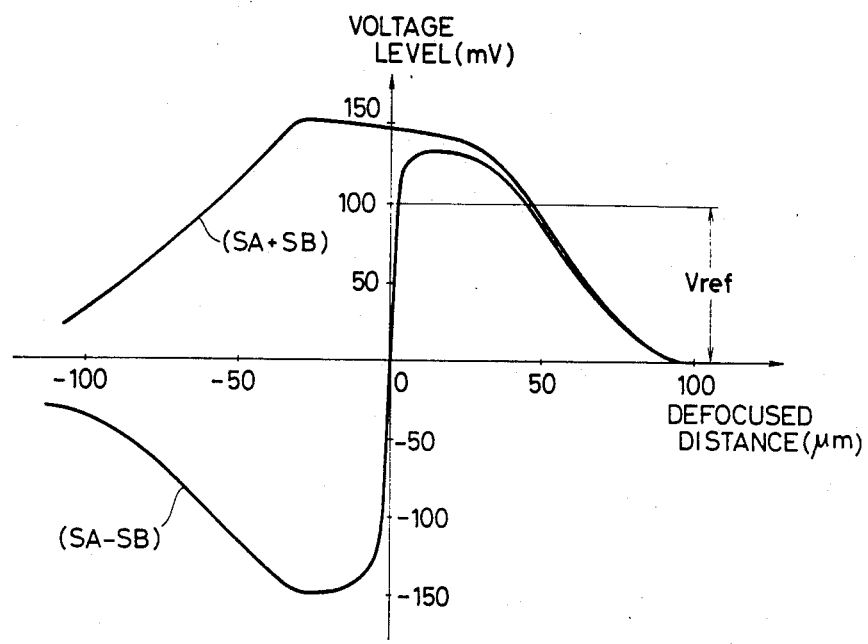
FIG. 1 is a graph showing the relationship between a defocused distance and a voltage level.

An embodiment of the present invention will be described in greater detail with reference to FIGS. 1 through 4.

Those parts in FIGS. 1 through 4 which are identical to those shown in FIGS. 5 through 11 will be denoted by identical reference characters.

Figure 2:
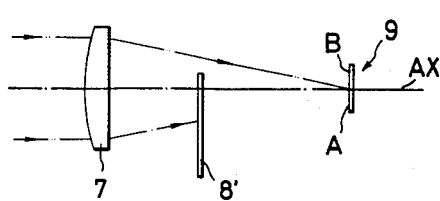
FIG. 2 is a schematic diagram of an optical pickup system.
Figure 3:
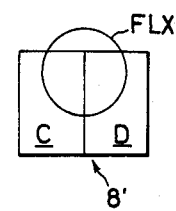
FIG. 3 is a view explanating the manner in which a reflected beam is detected by a first detector in the optical pickup system of FIG. 2.
Figure 5:
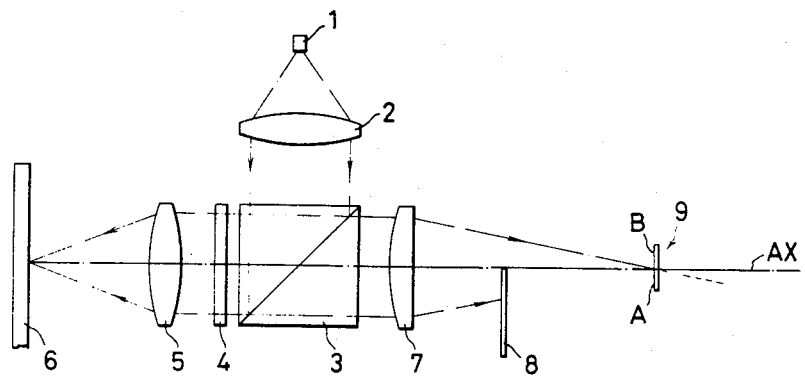
FIG. 5 is a schematic diagram of an optical pickup system.
Figure 6:
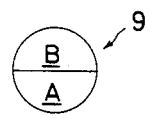
FIG. 6 is a front elevational view of a second detector in the optical pickup system of FIG. 5.
Figure 8:
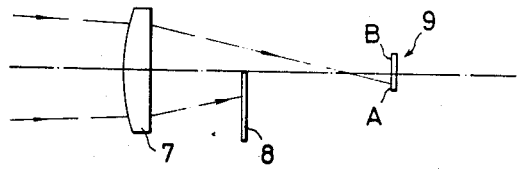
FIG. 8 is a schematic diagram of the optical pickup system of FIG. 5, showing a defocused condition.
Figure 7:
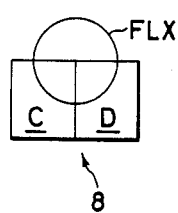
FIG. 7 is a view explanating the manner in which a reflected beam is detected by a first detector in the optical pickup system of FIG. 5.
Figure 9:
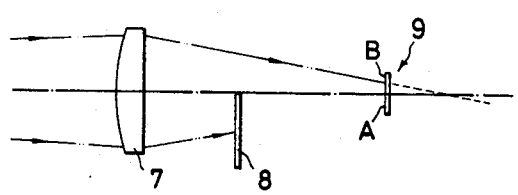
FIG. 9 is a schematic diagram of the optical pickup system of FIG. 5, showing another defocused condition.
Figure 10:
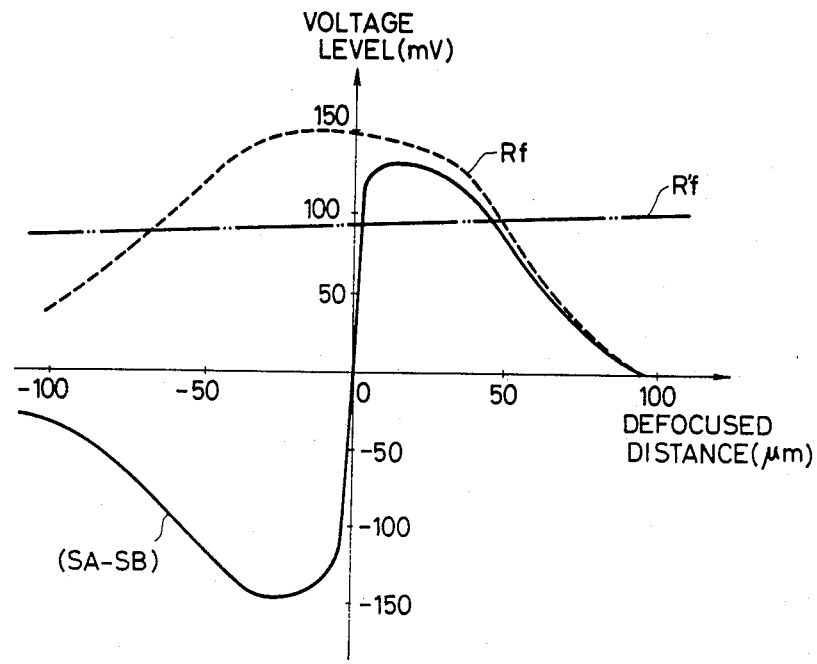
FIG. 10 is a graph showing the relationship between a defocused distance and a voltage level.
Figure 11:
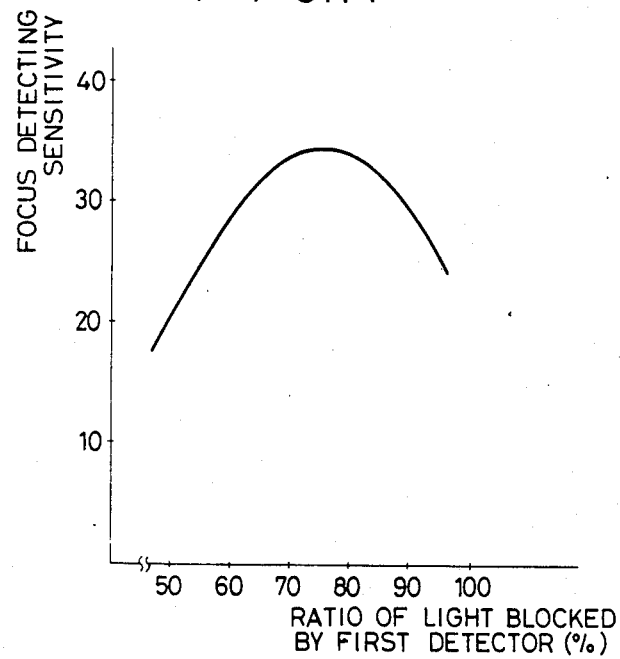
FIG. 11 is a graph illustrating the relationship between a ratio of light blocked by the first detector and a focal point detecting sensitivity.

As shown in FIGS. 2 and 3, a first detector 8' is positioned to detect 70 to 80% of a reflected laser beam from the disk 6 through the objective lens 5 to block 70 to 80% of the reflected laser beam which would otherwise reach the second detector 9.

The sum of the signals (SA+SB) from the light detecting areas A, B of the second detector 9 is plotted as a function of the defocused distance as shown in FIG. 1. FIG. 1 indicates that the sum signal (SA+SB) is represented by an upwardly convex curve which is in conformity with the focal point error signal (SA−SB) in one region and which has a certain voltage level at its peak corresponding to the focused position.

The position of the objective lens 5 in which (1) the sum signal (SA+SB) has a prescribed voltage level such as of 100 mV or higher and (2) the focal point error signal (SA−SB), is only the position in which the laser beam is focused by the objective lens 5 on the disk 6. Therefore, the focusing process should be carried out to meet the above two conditions (1) and (2), resulting in freedom from troubles such as the locking of the servo control system.

Figure 4:
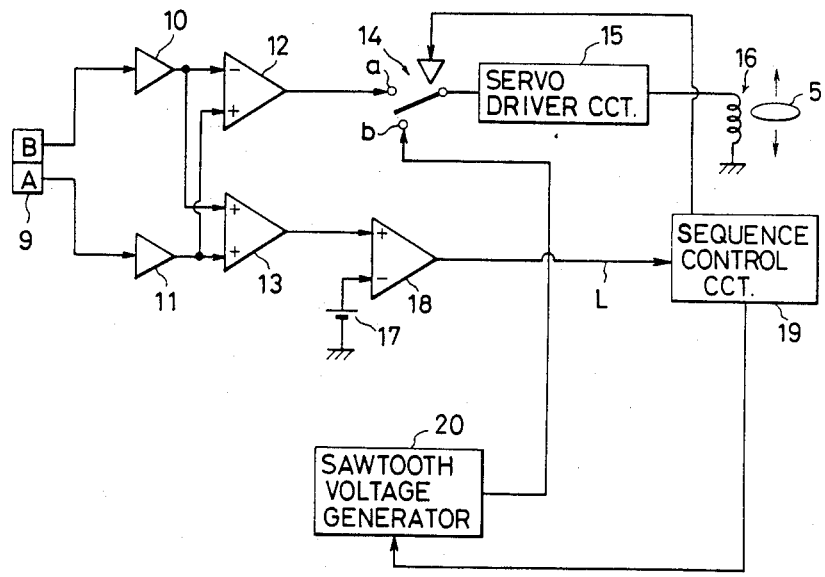
FIG. 4 is a block diagram of a control circuit according to an embodiment of the present invention.

The foregoing focusing principle according to the present invention can be implemented by a control circuit shown in FIG. 4.

The control circuit includes preamplifiers 10, 11 for converting a current to a voltage, a subtractor 12, an adder 13, a changeover switch 14, a servo driver circuit 15, a magnetic field generating coil 16, a reference voltage generator 17, a comparator 18, a sequence control circuit 19, and a sawtooth voltage generator 20. The changeover switch 14 has a movable contact can be moved between a conctact b for connecting the servo driver circuit 15 and the sawtooth voltage generator 20 and a contact a for connecting the servo driver circuit 15 and the subtractor 12. Although not shown, the objective lens 5 is supported in a cylinder having a magnet so as to be movable toward or away from the disk 6 dependent on the current supplied to the magnetic field generating coil 16 for focusing control.

When the objective lens 5 is in its original position, the movable contact of the changeover switch 14 is connected to the contact b.

In the focusing process, a focusing start signal is fed from the sequence control circuit 19 to the sawtooth voltage generator 20 to enable the sawtooth voltage generator 20 to supply a sawtooth voltage through the changeover switch 14 to the servo driver circuit 15 for thereby moving the objective lens 5 toward the disk 6.

As the objective lens 5 approaches the disk 6 and the defocused distance is reduced below 100 micrometers, the sum signal (SA+SB) from the adder 13 is progressively increased as shown in FIG. 1. When the sum signal (SA+SB) goes higher than a reference voltage level Vref from the reference voltage generator 17, the output L from the comparator 18 changes from a low level to a high level. For example, if Vref=100 mV, then the output L is in high level when the defocused distance is in the range of about ±50 micrometers, and is in low level out of that range. In response to the output L going high, it is detected that the objective lens 5 enters a focusing range, and the sequence control circuit 19 shifts the movable contact of the changeover switch 14 from the contact b to the contact a. The focal point error signal (SA−SB) from the subtractor 12 is now applied to the servo driver circuit 15 which supplies a current to the magnetic field generating coil 15 to move the objective lens 5 in focus servo control so that the focal point error signal (SA−SB) will be eliminated.

The focus servo control is effected properly to focus the laser beam on the disk 6 while preventing the servo control system from being locked under conditions other than when the laser beam is focused.

Although a certain preferred embodiment has been shown and described, it should be understood that many changes and modifications may be made therein without departing from the scope of the appended claims.

What is claimed is:

1. A method of detecting the focal point in an optical pickup employing a knife-edge focal point detection, comprising the steps of:
   (a) converging a laser beam through an objective lens as a small spot on an optical information storage medium;
   (b) detecting more than half of a laser beam reflected from said optical information storage medium through said objective lens with a first track-deviation detector composed of a plurality of light detecting areas;
   (c) detecting less than half of the reflected laser beam with a second focal-point detector composed of a plurality of light detecting areas; and
   (d) positionally adjusting said objective lens with respect to said optical information storage medium so that a sum signal indicating the sum of signals from said light detecting areas of said second detector will be greater than a prescribed value and a difference signal indicating the difference between the signals from said light detecting areas of said second detector will be eliminated, for focusing said laser beam on said optical information storage medium.

2. A device for detecting the focal point in an optical pickup wherein a laser beam is converged by an objective lens as a small spot on an optical information storage medium, said device comprising:
   (a) a detector having a plurality of light detecting areas for detecting less than half of a laser beam reflected from said optical information storage medium through said objective lens;
   (b) first means for detecting when said objective lens enters a focusing range in response to a sum signal indicative of the sum of output signals from said light detecting areas of said detector; and
   (c) second means operable upon detection by said first means for positionally adjusting said objective lens with respect to said optical information storage medium so that a difference signal indicative of the difference between the output signals from said light detecting areas will be eliminated.

3. A device according to claim 2, wherein said first means detects when said objective lens enters the focusing range when said sum signal exceeds a prescribed value.

* * * * *